(12) United States Patent
Mikashima

(10) Patent No.: US 11,265,436 B2
(45) Date of Patent: Mar. 1, 2022

(54) IMAGE FORMING APPARATUS AND METHOD FOR CONTROLLING AN IMAGE FORMING APPARATUS

(71) Applicant: KYOCERA Document Solutions Inc., Osaka (JP)

(72) Inventor: Katsuo Mikashima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/177,681

(22) Filed: Feb. 17, 2021

(65) Prior Publication Data
US 2021/0258441 A1    Aug. 19, 2021

(30) Foreign Application Priority Data
Feb. 18, 2020 (JP) .............................. JP2020-025531

(51) Int. Cl.
| | | |
|---|---|---|
| G06F 15/00 | (2006.01) | |
| H04N 1/00 | (2006.01) | |
| H04N 1/028 | (2006.01) | |
| G06K 15/02 | (2006.01) | |
| G06K 15/00 | (2006.01) | |

(52) U.S. Cl.
CPC ..... *H04N 1/00909* (2013.01); *G06K 15/1886* (2013.01); *G06K 15/408* (2013.01); *H04N 1/00352* (2013.01); *H04N 1/00408* (2013.01); *H04N 1/02815* (2013.01)

(58) Field of Classification Search
CPC ........... H04N 1/00909; H04N 1/00352; H04N 1/00408; H04N 1/02815; G06K 15/1886; G06K 15/408
USPC ........................................................ 358/1.14
See application file for complete search history.

(56) References Cited

U.S. PATENT DOCUMENTS

| | | | |
|---|---|---|---|
| 2007/0182806 A1* | 8/2007 | Kobayashi | ............... B41J 2/471 347/158 |
| 2018/0364609 A1* | 12/2018 | Ishidate | ........... G03G 15/04054 |
| 2018/0364612 A1* | 12/2018 | Ishidate | ............. G03G 21/1647 |
| 2020/0117114 A1* | 4/2020 | Otsubo | ............. G03G 21/1647 |

FOREIGN PATENT DOCUMENTS

JP        2002-320077 A      10/2002

* cited by examiner

*Primary Examiner* — Mark R Milia
(74) *Attorney, Agent, or Firm* — Stein IP, LLC

(57) ABSTRACT

An image forming apparatus includes a display panel, a sheet conveying passage, a reading unit, a light source, a chassis, and a controller. The reading unit includes a light transmitting plate and a conveying image sensor. The conveying image sensor reads a conveyed sheet, which is a sheet to print on. The chassis has a cleaning hole in which to insert a cleaning rod for rubbing the light-transmitting plate. In a maintenance mode, the controller turns on the light source, and makes the display panel display a graph showing the pixel values of the pixels included in conveyed-and-read image data acquired by reading with the conveying image sensor.

10 Claims, 9 Drawing Sheets

IMAGE FORMING APPARATUS AND METHOD FOR CONTROLLING AN IMAGE FORMING APPARATUS

INCORPORATION BY REFERENCE

This application is based on and claims the benefit of Japanese Patent Application No. 2020-025531 filed on Feb. 18, 2020, the contents of which are hereby incorporated by reference.

BACKGROUND

The present disclosure relates to an image forming apparatus that reads a sheet being conveyed toward a part where printing is performed.

A device that reads a document while moving it is known. A device that reads a document is provided with a contact glass. For example, a document is conveyed over a contact glass. Across the contact glass, an image sensor reads the document. Particles of paper, dust, coloring materials (toner, ink) on the document, correction fluid applied to the document, and the like can attach to the contact glass. The attached matter can irregularly reflects light, or absorbs light. This can lead to inadequate shading, or streaks in image data. A known technology is directed to the cleaning of a contact glass in an image reading device as noted below.

Specifically, an image reading device is known that operates in the following manner: a document is read; shading data is sensed; the sensed shading data is checked for an error; whether a document is on a document set portion is sensed; according to any error detected in the shading data, error information is printed out before the start of document reading; the end of a cleaning process performed based on the error information is recognized; after the cleaning process, the shading data is checked again; if an error is detected, error information is indicated; a contact glass is arranged at the document reading position; a white pressure plate to serve as a white reference is arranged to press against the document reading surface; any soil that caused the error in the shading data is recognized; a method for removing the soil is determined; where on the white pressure plate or the contact glass the soil is located is determined; and, information on the method of removing the soil and the location of the soil is printed out as error information.

What is read is not always a document but is often a sheet (conveyed sheet) that is being conveyed toward a part where printing will be performed using ink or toner. Based on the result of reading a conveyed sheet, for example, the size of the conveyed sheet can be recognized. Reading a conveyed sheet requires a reading unit to be arranged on the sheet conveying passage. The reading unit includes an image sensor and a contact glass. The conveyed sheet passes across the contact glass while in contact with or facing it. The contact glass is located between the conveyed sheet and the image sensor. The contact glass on one hand guides the conveyed sheet and on the other hand protects the image sensor.

Also in a reading unit that reads a conveyed sheet, the contact glass can be soiled. For example, particles of paper of the conveyed sheet can attach to the contact glass. Soil on the contact glass can cause erroneous detection of an edge of the conveyed sheet.

A document reading device is designed to allow a contact glass to be exposed. For example, opening a document presser permits the contact glass of the document reading device to be exposed. For another example, opening a cover permits the contact glass and the conveying passage to be exposed. Soil on the contact glass can be directly recognized by sight. Whether the soil has been removed can be readily seen.

On the other hand, a reading unit that reads a sheet being conveyed may be incorporated as part of a sheet conveying passage. Such a reading unit is often arranged such that it cannot be exposed to the outside. In such a case, soil on a contact glass cannot be directly recognized by sight. How the soil has been wiped off cannot always be readily seen. Compared with a document reading device, a reading unit for conveyed sheets suffers from difficult cleaning of the contact glass. With the known document reading device mentioned above, opening the cover allows the user to perform cleaning while seeing the contact glass. The above-mentioned problem, however, is not solved.

SUMMARY

According to one aspect of the present disclosure, an image forming apparatus includes a display panel, a sheet conveying passage, a reading unit, a light source, a chassis, and a controller. Along the sheet conveying passage, sheets are conveyed. The reading unit includes a light-transmitting plate. The reading unit includes a conveying image sensor that reads a conveyed sheet, that is, a sheet on which to print and that is conveyed while facing the light-transmitting plate. The light source faces the light-transmitting plate. The light source emits light toward the conveying image sensor. The chassis includes a cleaning hole in which to insert a cleaning rod for rubbing the light-transmitting plate. In a maintenance mode, the controller turns on the light source, and makes the display panel display a graph showing the pixel values of the pixels included in conveyed-and-read image data acquired by reading with the conveying image sensor.

According to another aspect of the present disclosure, a method of controlling an image forming apparatus includes conveying a sheet along a sheet conveying passage, reading with a conveying image sensor a conveyed sheet, that is, a sheet on which to print and that is conveyed while facing a light-transmitting plate, emitting light from a light source facing the light-transmitting plate toward the conveying image sensor, inserting in a cleaning hole a cleaning rod for rubbing the light-transmitting plate, and, in a maintenance mode, turning on the light source and displaying a graph showing the pixel values of the pixels included in conveyed-and-read image data acquired by reading with the conveying image sensor.

Further features and benefits of the present disclosure will become apparent from the description of embodiments which follows.

DETAILED DESCRIPTION

The present disclosure relates to enabling determination of the location of soil on a light-transmitting plate in a reading unit for conveyed sheets, and relates also to enabling determination of the progress of cleaning. Hereinafter, with reference to FIGS. 1 to 12, an embodiment of the present disclosure will be described. The following description deals with a printer as an example of an image forming apparatus. In the following description, the printer (image forming apparatus 100) performs printing using ink. The image forming apparatus 100 may be a multifunction peripheral.

(Outline of Image Forming Apparatus 100)

Figure 1:
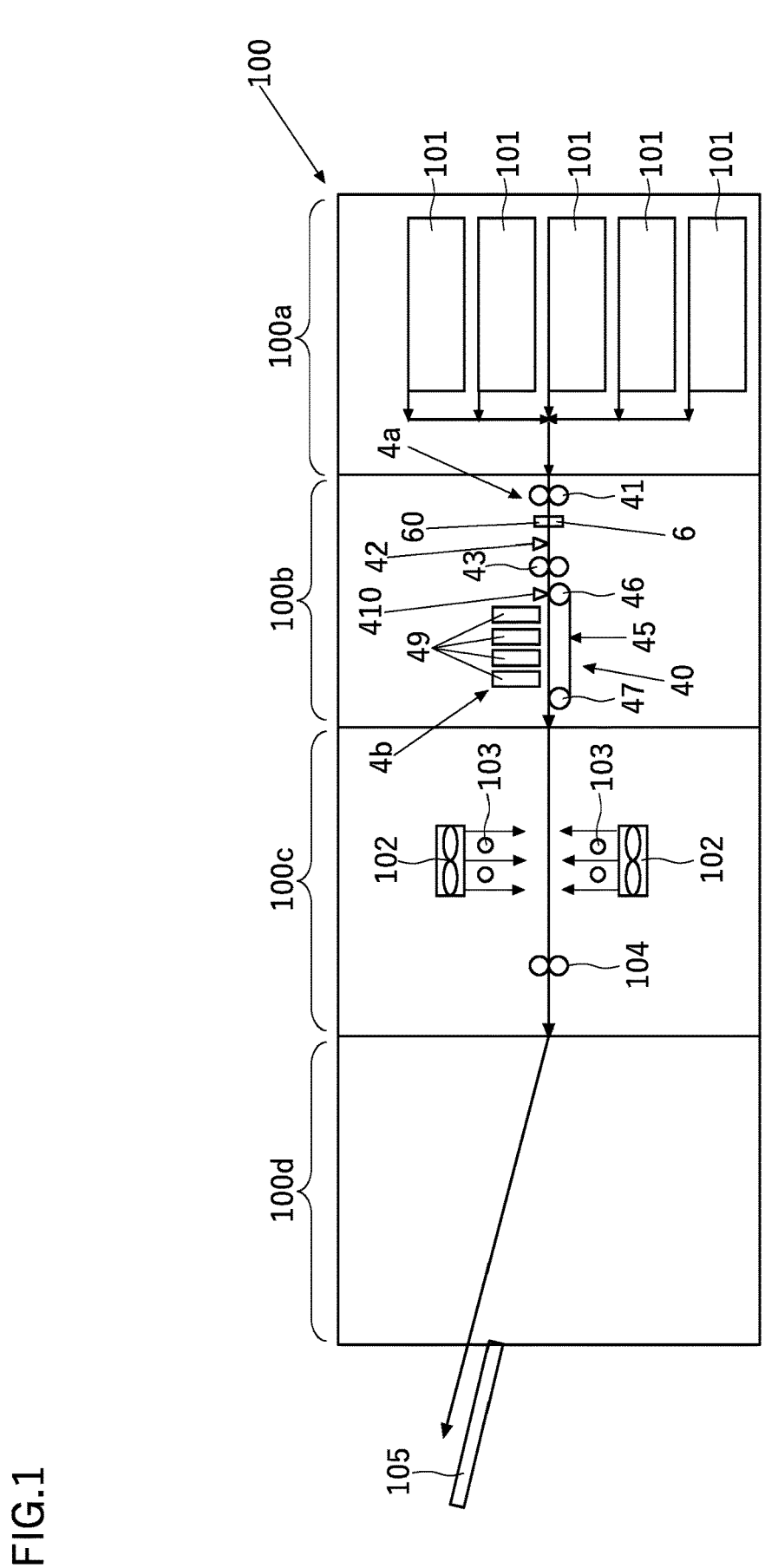
FIG. 1 is a diagram showing one example of an image forming apparatus according to an embodiment.

First, with reference to FIGS. 1 and 2, the image forming apparatus 100 according to the embodiment will be described in outline. As shown in FIG. 1, the image forming apparatus 100 includes a sheet feeding device 100*a*, a printing device 100*b*, a first post-processing device 100*c*, and a second post-processing device 100*d*. In FIG. 1, solid-line arrows indicate the sheet conveying direction. The sheet feeding device 100*a* and the printing device 100*b* are coupled (connected) together. The printing device 100*b* and the first post-processing device 100*c* are coupled (connected) together. The first post-processing device 100*c* and the second post-processing device 100*d* are coupled (connected) together.

The sheet feeding device 100*a* includes a plurality of sheet feeding cassettes 101. Each sheet feeding cassettes 101 stores sheets. During printing, sheets are supplied from one of the sheet feeding cassettes 101. Each sheet feeding cassette 101 is provided with a sheet feeding roller. During printing, the sheet feeding roller of the sheet feeding cassette 101 that supplies sheets rotates. The sheet feeding device 100*a* conveys the supplied sheets toward the printing device 100*b*. For the conveying of the supplied sheets, the sheet feeding device 100*a* includes a pair of rollers and a conveying passage.

The printing device 100*b* performs printing on a sheet The printing device 100*b* performs printing using ink. The first post-processing device 100*c* performs drying and decurling (removal of curls) on a sheet. For the drying of ink, the first post-processing device 100*c* includes a fan 102 and a heater 103. The fan 102 blows air onto a sheet that has undergone printing by the printing device 100*b*. The heater 103 heats the air that is blown onto the sheet. This enables the drying of ink. The first post-processing device 100*c* also includes a pair of decurling rollers 104. The pair of decurling rollers 104 applies pressure on a sheet. The second post-processing device 100*d* discharges a sheet onto a discharge tray 105.

The second post-processing device 100*d* reverses a sheet top side bottom so that its printed face points down.

Figure 2:
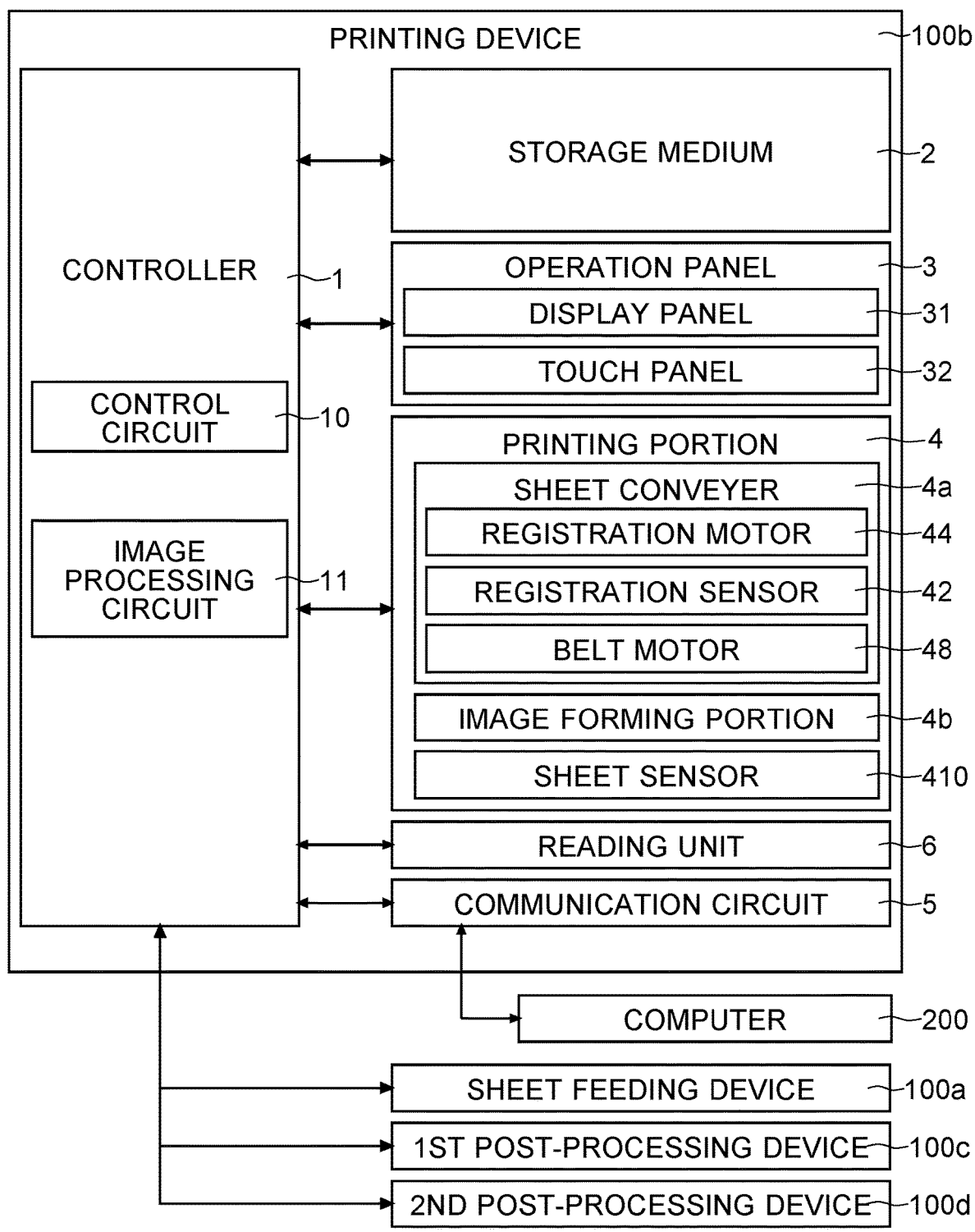
FIG. 2 is a diagram showing one example of the image forming apparatus according to the embodiment.

As shown in FIG. 2, the printing device 100*b* includes a controller 1, a storage medium 2, an operation panel 3, a printing portion 4, and a communication circuit 5. The controller 1 controls the operation of different parts of the printing device 100*b*, the sheet feeding device 100*a*, the first post-processing device 100*c*, and the second post-processing device 100*d*. The controller 1 is a circuit board that includes a control circuit 10 and an image processing circuit 11.

For example, the control circuit 10 is a CPU. The control circuit 10 performs calculation and processing based on control programs and control data stored in the storage medium 2. The storage medium 2 includes a nonvolatile storage device such as a ROM or a storage drive (HDD or SSD). The storage medium 2 also includes a volatile storage device such as a RAM. The image processing circuit 11 performs image processing on the image data used in printing.

The image forming apparatus 100 includes the operation panel 3. The operation panel 3 includes a display panel 31 and a touch panel 32. The controller 1 makes the display panel 31 display setting screens and information. The display panel 31 displays operation-related images such as keys, buttons, and tabs. The touch panel 32 senses touch operations on the display panel 31. Based on the output from the touch panel 32, the controller 1 recognizes operated operation-related image. The controller 1 recognizes setting operations made by a user. For example, the operation panel 3 accepts selection of a sheet feeding cassette 101 to be used in printing. During a print job, the controller 1 makes the sheet feeding roller of the selected sheet feeding cassette 101 rotate. Then the controller 1 makes a sheet advance into a sheet conveyer 4*a* in the printing device 100*b*.

The printing device 100*b* (image forming apparatus 100) includes the printing portion 4. The printing device 100*b* includes, as the printing portion 4, the sheet conveyer 4*a*, an image forming portion 4*b*, and a sheet sensor 410. During a print job. the controller 1 controls the operation of the printing portion 4.

The controller 1 makes the sheet feeding device 100*a* convey the sheet supplied from the sheet feeding device 100*a*. The controller 1 makes the sheet conveyer 4*a* convey the sheet toward the image forming portion 4*b*. As shown in FIG. 1, on the conveying passage in the sheet conveyer 4*a*, there are arranged, in order from upstream in the sheet conveying direction, a pair of conveying rollers 41, a reading unit 6 with a light source 60, a registration sensor 42, a pair of registration rollers 43, the sheet sensor 410, a conveying unit 40, and a line head 49. To make the pair of registration rollers 43 rotate, a registration motor 44 is provided. The controller 1 controls the rotation of the registration motor 44, and thereby controls the rotation of the pair of registration rollers 43.

The printing device 100*b* includes the registration sensor 42. The registration sensor 42 is provided upstream of the pair of registration rollers 43 in the sheet conveying direction. The output level of the registration sensor 42 varies according to whether a sheet is sensed to be present. The output of the registration sensor 42 is fed to the controller 1. Based on the output from the registration sensor 42, the controller 1 recognize the leading end of a sheet to have reached the registration sensor 42. The controller 1 also recognizes the trailing end of the sheet to have left the registration sensor 42.

When a sheet has just reached the pair of registration rollers 43, the controller 1 keeps the pair of registration rollers 43 at rest. For example, when the trailing end of the preceding sheet leaves the registration sensor 42, the controller 1 stops the pair of registration rollers 43. The controller 1 makes rotate the pair of conveying rollers 41, which is located adjacently upstream of the pair of registration rollers 43. The leading end of a sheet runs onto the pair of registration rollers 43, and as a result the sheet sags, with the leading end of the sheet fitting along the nip between the pair of registration rollers 43. Any skew of the sheet is corrected. After the recognition of the arrival of the leading end of the sheet at the registration sensor 42 based on its output, when a predetermined sag formation time elapses, the controller 1 makes the pair of registration rollers 43 rotate. Thus, the sheet is fed on toward the conveying unit 40.

The conveying unit 40 includes a conveying belt 45, a driving roller 46, and a driven roller 47. The conveying belt 45 is wound around the driving roller 46 and the driven roller 47. To make the driving roller 46 rotate, a belt motor 48 is provided. During a print job, the controller 1 makes the belt motor 48 rotate so that the conveying belt 45 moves around. The conveying belt 45 sucks a sheet onto it. For example, the conveying belt 45 has a plurality of apertures formed in it. To suck air through those apertures, a suction device (not illustrated) is provided. By suction, a sheet can be kept in position on the belt.

Figure 4:
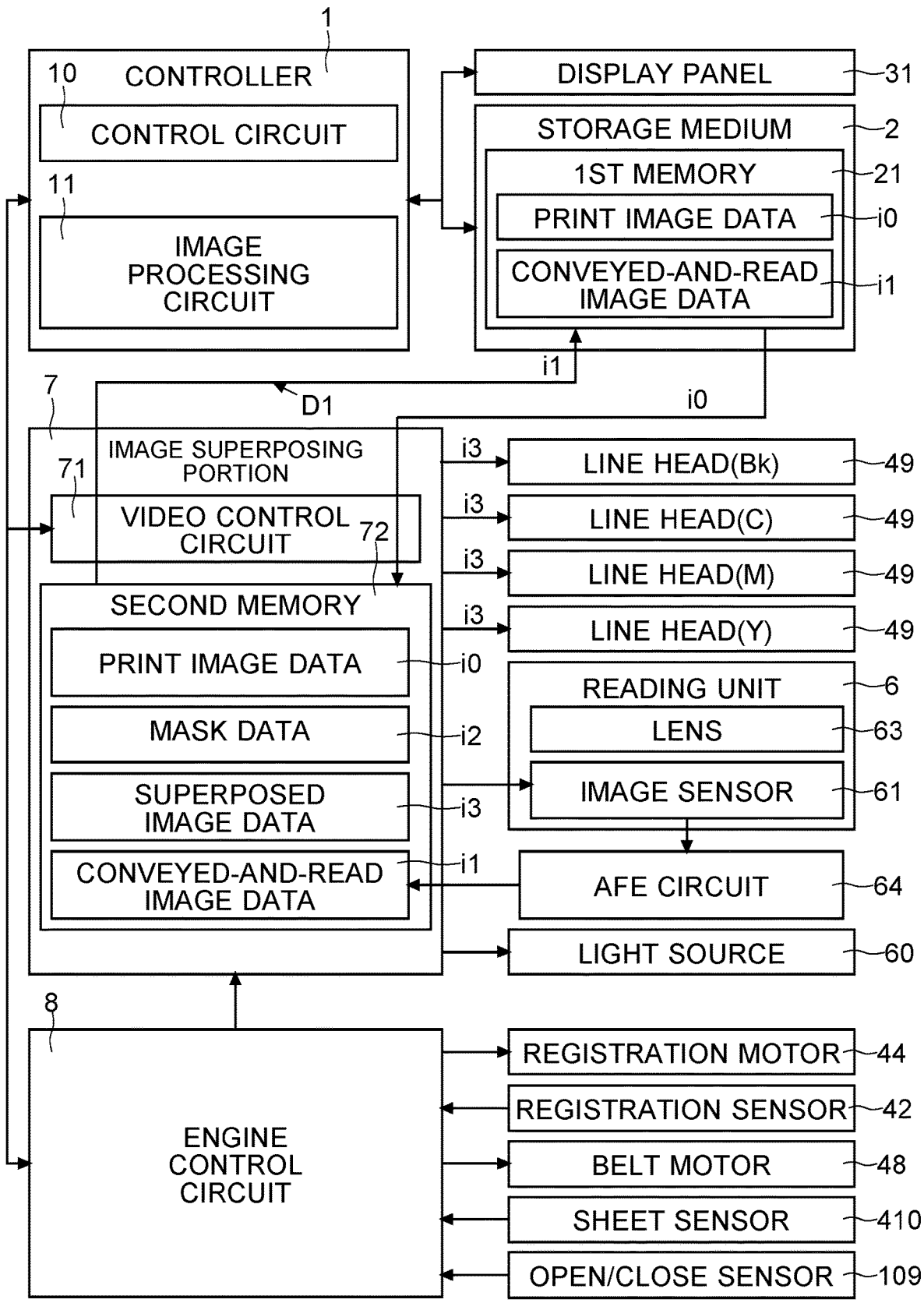
FIG. 4 is a diagram showing one example of the flow of image data in the image forming apparatus according to the embodiment.

The image forming portion 4b performs printing on a conveyed sheet. The image forming portion 4b ejects ink onto the conveyed sheet to record an image. As shown in FIGS. 1 and 4, the image forming portion 4b includes four line heads 49. The line heads 49 comprise one that discharges black ink, one that discharges yellow ink, one that discharges cyan ink, and one that discharges magenta ink. Each line head 49 is fixed in position. The line heads 49 are arranged over the conveying unit 40 (conveying belt 45). Each line head 49 has nozzles at its bottom face. Between the nozzles and the conveying belt 45, a predetermined gap is secured. Through this gap, sheets pass.

The line head 49 includes a plurality of nozzles. The nozzles are arrayed in the direction (main scanning direction; the direction perpendicular to the plane of FIG. 1) perpendicular to the sheet conveying direction. Each nozzle has an opening that faces the conveying belt 45. The controller 1 supplies print image data i0 for printing. Based on the print image data i0, the line heads 49 eject ink from the nozzles onto the conveyed sheet. The ink lands on the conveyed sheet. Thus, an image is recorded (formed).

Upstream of the line heads 49, the sheet sensor 410 is provided. The sheet sensor 410 senses arrival of the leading end of a sheet and departure of the trailing end of the sheet. The output level of the sheet sensor 410 differs according to whether a sheet is or is not being sensed to be present. The sheet sensor 410 is a sensor for deciding when to start printing a page. The output of the sheet sensor 410 is fed to the controller 1. Based on the output from the sheet sensor 410, the controller 1 recognizes the leading end of a sheet to have reached the sheet sensor 410. After the recognition of the arrival of the leading end, when a predetermined wait time elapses, the controller 1 makes the line heads 49 start ejecting ink (forming an image) for the first line. Each line head 49 has a wait time for it prescribed. For example, the wait time is a time resulting from dividing the distance from the sheet sensing position of the sheet sensor 410 to the nozzles of the line head 49 by an ideal (i.e., as stated on the specification) sheet conveying speed.

The controller 1 is connected to the communication circuit 5. The communication circuit 5 includes a communication connector, a communication control circuit, and a communication memory. The communication memory stores communication software. The communication circuit 5 communicates with a computer 200. For example, the computer 200 is a PC or a server. The controller 1 receives print data from the computer 200. The print data contains print settings and print content. For example, the print data contains data coded in a page-description language. The controller 1 (image processing circuit 11) analyzes the received (entered) print data. Based on the received print data, the controller 1 generates raster data (image data).

(Light Source 60 and Reading Unit 6)

Next, with reference to FIGS. 1 to 3, one example of the reading unit 6 according to the embodiment will be described. The reading unit 6 reads a conveyed sheet. As shown in FIG. 1, the reading unit 6 is provided upstream, in the sheet conveying direction, of the pair of registration rollers 43, the registration sensor 42, and the most upstream line head 49. In the example shown in FIG. 1, the reading unit 6 and the light source 60 are provided between the pair of conveying rollers 41 and the registration sensor 42.

Figure 3:
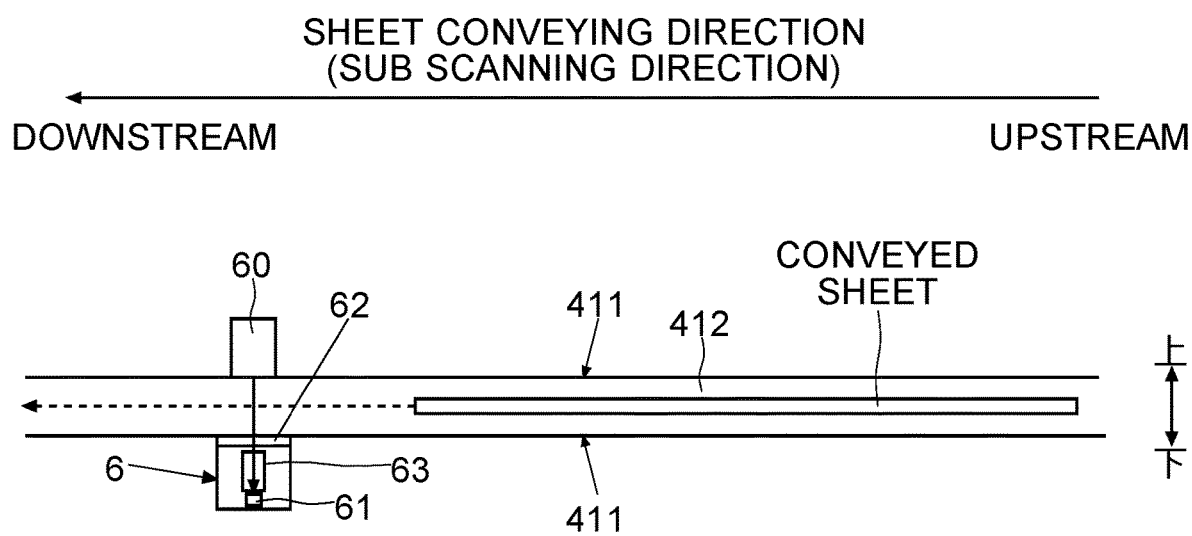
FIG. 3 is a diagram showing one example of a reading unit according to the embodiment.

As shown in FIGS. 3 and 4, the reading unit 6 includes a conveying image sensor 61. The conveying image sensor 61 is a line sensor. The conveying image sensor 61 includes a plurality of light-receiving elements. The plurality of light-receiving elements are arrayed in the main scanning direction (the direction perpendicular to the plane of FIG. 3; the direction perpendicular to the sheet conveying direction). The conveying image sensor 61 reads a conveyed sheet in the main scanning direction.

Inside the body of the image forming apparatus 100 (printing device 100b), a conveying guide 411 forms a sheet conveying passage 412. The sheet conveying passage 412 is part of the sheet conveyer 4a. For example, the reading unit 6 is provided under the sheet conveying passage 412. The reading unit 6 includes a light-transmitting plate 62. The light-transmitting plate 62 constitutes the top face of the reading unit 6. The light-transmitting plate 62 is a plate of glass or a light-transmitting resin. The light-transmitting plate 62 is, for example, a contact glass. The conveying image sensor 61 is located so as to face the light-transmitting plate 62, and reads a sheet (conveyed sheet). The light-transmitting plate 62 functions also as the conveying guide 411.

The light source 60 is provided at a position facing the top face of the reading unit 6. The light source 60 is provided at a position where a conveyed sheet passes between it and the conveying image sensor 61. The light source 60 emits light along the main scanning direction. The light source 60 emits light toward the sheet conveying passage 412, the conveyed sheet, and the conveying image sensor 61 (light-transmitting plate 62) (in FIG. 3, downward). The optical path intersects the sheet conveying passage 412 in the up-down direction. The conveyed sheet intercepts the optical path.

The top face of the reading unit 6 transmits light. For example, inside the reading unit 6, there are provided a lens 63 (rod lens array) and the conveying image sensor 61. The light from the light source 60 passes through the lens 63 and strikes the conveying image sensor 61. The reading unit 6 is a reading device of a CIS type.

The conveying image sensor 61 includes a plurality of light-receiving elements. The light-receiving elements are arrayed in the main scanning direction. The conveying image sensor 61 outputs as an analog image signal the electric charge accumulated in the light-receiving elements. During sheet conveying, the conveying image sensor 61 repeats reading on a line-by-line basis. The conveying image sensor 61 outputs the analog image signal each time it reads a line. The analog image signals are subjected to analog-to-digital conversion to generate conveyed-and-read image data i1.

When no sheet is present between the light source 60 and the reading unit 6, the light from the light source 60 strikes the conveying image sensor 61. When a sheet is present between the light source 60 and the reading unit 6, the light from the light source 60 is intercepted by the sheet. Thus, in the conveyed-and-read image data i1, the pixels that read the sheet (the pixels at which the sheet is present) have dim (dark, black) pixel values, while the pixels that read an area with no sheet present have bright (light, white) pixel values. Based on the location of the boundary between the high- and low-density pixels, the controller 1 recognize an edge (end) of the conveyed sheet in the main scanning direction.

(Flow of Image Data)

Next, with reference to FIG. 4, one example of the flow of image data in the image forming apparatus 100 according to the embodiment will be described. The image processing circuit 11 in the controller 1 generates raster data (image data) based on the print data transmitted from the computer 200 and received by the communication circuit 5. The image processing circuit 11 also subjects the raster data to image processing according to the print settings. Eventually the image processing circuit 11 generates, as print image data i0, image data that indicates whether ink is discharged or not from the individual nozzles (at the individual pixels). The image processing circuit 11 generates a set of print image data i0 for each color. The controller 1 makes a first memory 21 store the generated print image data i0. The storage medium 2 includes the first memory 21. The first memory 21 is, for example, a DRAM.

The image forming apparatus 100 (100b) includes an AFE circuit 64 (analog front-end circuit). The AFE circuit 64 processes the analog image signals fed from the individual light-receiving elements of the image sensor. The AFE circuit 64 converts the processed analog image signals into digital values, and thereby generates conveyed-and-read image data i1. The AFE circuit 64 generates monochrome image data that contains eight bits per pixel (it may contain more than eight bits per pixel). The AFE circuit 64 feeds (transmits) the generated conveyed-and-read image data i1 (digital values at individual pixels) to a second memory 72.

The image forming apparatus 100 includes an image superposing portion 7. The image superposing portion 7 includes, for example, a video control circuit 71 and the second memory 72. The image superposing portion 7 is a circuit board or a chip. The video control circuit 71 is, for example, a CPU. The second memory 72 is, for example, a DRAM.

The controller 1 transmits, for each color, the print image data i0 in the first memory 21 to the second memory 72. The second memory 72 stores the received print image data i0. On the other hand, the video control circuit 71 recognizes a region where no sheet is present. For example, the video control circuit 71 recognizes any region where a sheet is dog-eared or punched through. Moreover, based on the conveyed-and-read image data i1, the video control circuit 71 recognizes the position of the edges of a sheet. Based on the results of recognition, the video control circuit 71 recognizes the size of the sheet, the amount and direction of deviation of the position of the sheet, and the like.

Based on the amount and direction of deviation of the position of the sheet, the video control circuit 71 shifts the positions of the pixels in the print image data i0 in the direction perpendicular to the sheet conveying direction (thus performing in shifting main scanning direction). For example, the video control circuit 71 shifts the positions of the pixels in the print image data i0 in the recognized direction, by the amount equal to the recognized amount. Based on the recognized region where no sheet is present, the video control circuit 71 generates mask data i2. The mask data i2 is used to prevent discharge of ink onto a region where no sheet is present.

The video control circuit 71 generates superposed image data i3. The superposed image data i3 results from subjecting the print image data i0 to shifting and masking. For example, the video control circuit 71 superposes together the mask data i2 and the shifted print image data i0. The video control circuit 71 sets, with respect to the pixels in the print image data i0 where ink is discharged, the pixel values of the pixels where no sheet is present at pixel values indicating no ink discharge (thus performing masking). The video control circuit 71 generates one set of mask data i2 for each color in performing masking. This prevents ink from being discharged outside the sheet. The video control circuit 71 transmits the superposed image data i3 of different colors to the corresponding line heads 49. Based on the received (supplied) superposed image data i3, the line heads 49 eject ink.

The image forming apparatus 100 includes an engine control circuit 8. The engine control circuit 8 controls the operation of the sheet conveyer 4a. For example, the engine control circuit 8 controls the rotation of the registration motor 44 and the belt motor 48. The engine control circuit 8 also recognizes how sheets are being conveyed based on the outputs of the registration sensor 42 and the sheet sensor 410.

The engine control circuit 8 further gives the image superposing portion 7 (video control circuit 71) a notification that the leading end of a sheet has reached under the nozzles. For example, after the sheet sensor 410 senses the leading end of a sheet having reached it, when a previously determined wait time elapses, the engine control circuit 8 gives the notification to the image superposing portion 7. In other words, the engine control circuit 8 notifies the video control circuit 71 of when to start discharging ink. On receiving the notification the video control circuit 71 starts to feed the superposed image data i3 to the line heads 49. For example, the wait time is the time resulting from dividing the distance from the sheet sensor 410 to the nozzles of a line head 49 by an ideal (i.e., as stated on the specification) sheet conveying speed.

(Cleaning of Light-Transmitting Plate 62)

Figure 6:
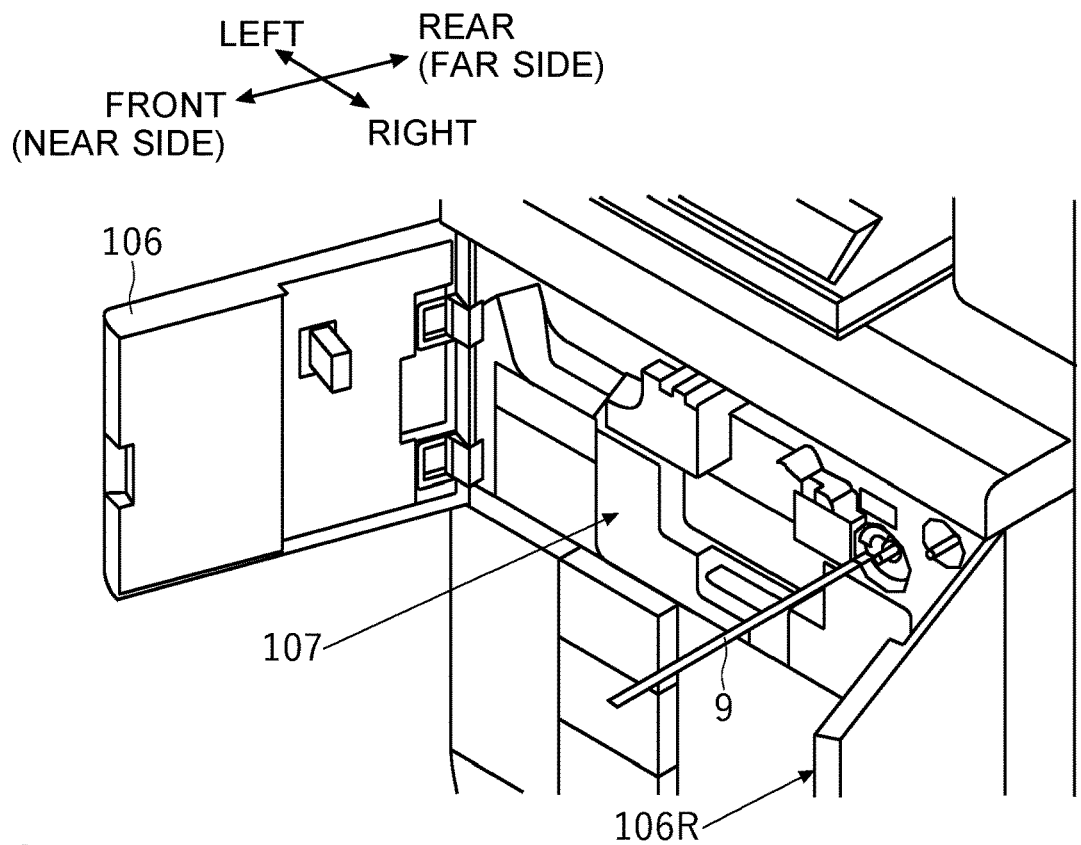
FIG. 6 is a perspective view of the front face of a printing device according to the embodiment, as seen from upper right.
Figure 7:
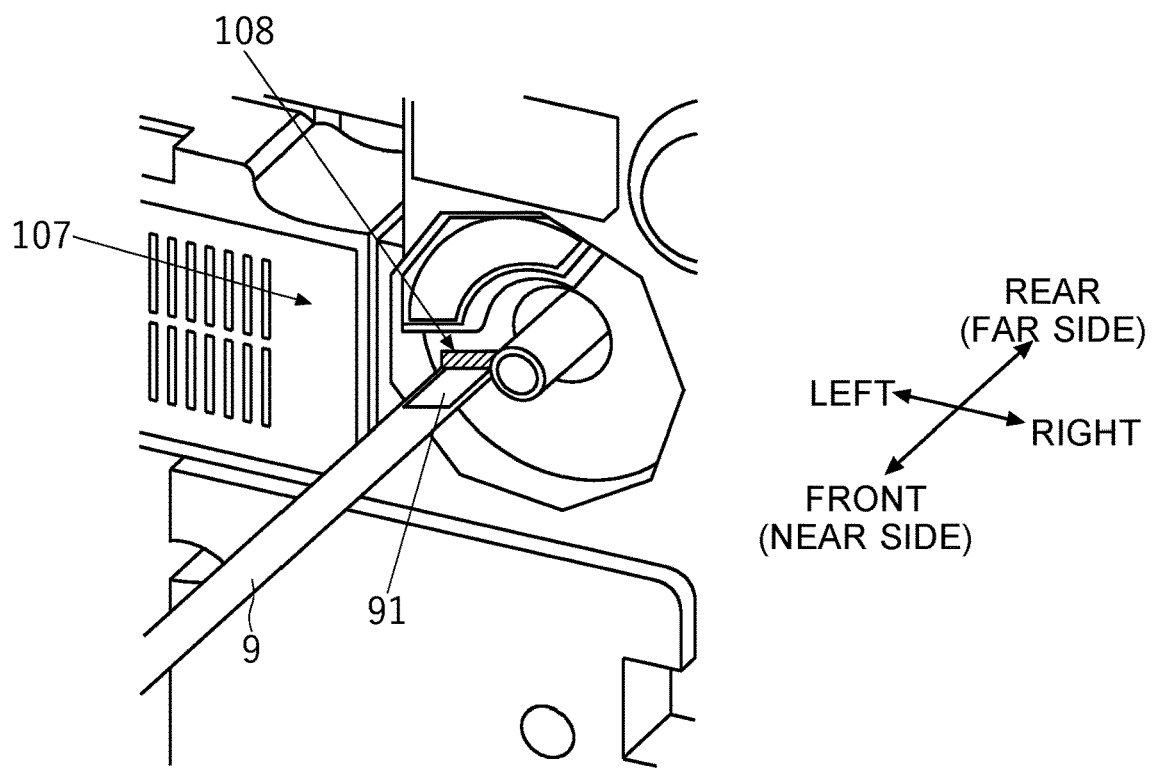
FIG. 7 is a perspective view of the front face of the printing device according to the embodiment, as seen from upper right.
Figure 8:
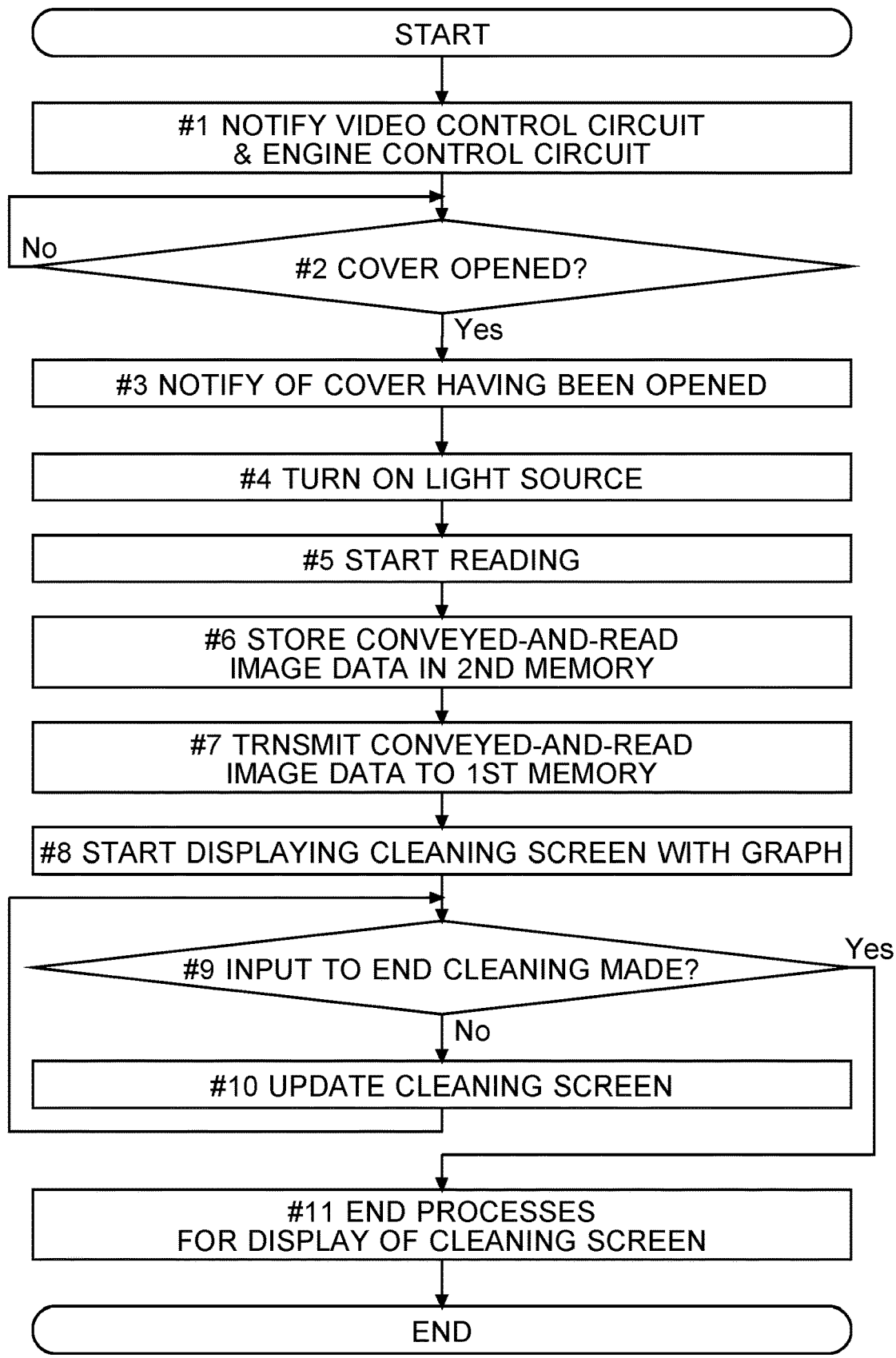
FIG. 8 is a diagram showing one example of cleaning of a light-transmitting plate in a maintenance mode on the image forming apparatus according to the embodiment.

Next, with reference to FIGS. 5 to 7, one example of the cleaning of the light-transmitting plate 62 according to the embodiment will be described. Along the sheet conveying passage 412, sheets are conveyed. The reading unit 6 (light-transmitting plate 62) faces the sheet conveying passage 412. The light-transmitting plate 62 functions also as the conveying guide 411. Inside the sheet conveying passage 412, particles of paper and dust are present. Some particles of paper or dust can attach to and soil the light-transmitting plate 62.

Figure 5:
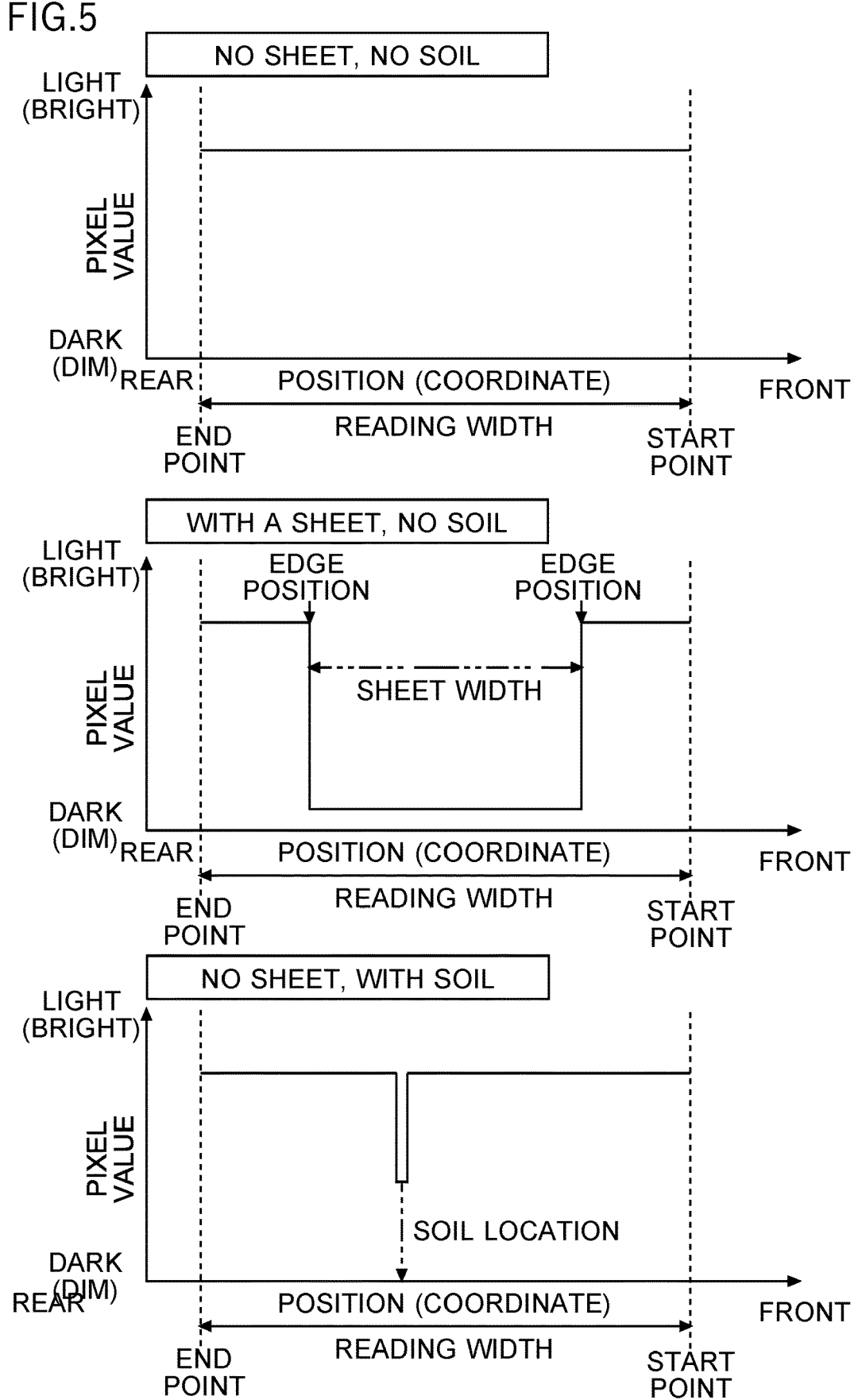
FIG. 5 is a diagram showing one example of conveyed-and-read image data according to the embodiment.

FIG. 5 shows one example of the conveyed-and-read image data i1 as acquired when the light source 60 is lit. In each graph in FIG. 5, the horizontal axis indicates the position (coordinate) of a pixel in the main scanning direction (the direction perpendicular to the sheet conveying direction). The main scanning direction is parallel to the front-rear direction of the image forming apparatus 100 (printing device 100b). Along the horizontal axis of the graphs in FIG. 5, the right side corresponds to the front side (near side) of the image forming apparatus 100, and the left side corresponds to the rear side (far side) of the image forming apparatus 100. The vertical axis in FIG. 5 indicates the level of density (bright or dim) represented by the pixel value of a pixel.

The top graph in FIG. 5 shows an example of the conveyed-and-read image data i1 as acquired when no sheet is present between the light source 60 and the conveying image sensor 61 and in addition the light-transmitting plate 62 is clean. All the pixels (light-receiving elements) of the conveying image sensor 61 evenly receive light. Thus, the pixels in the conveyed-and-read image data i1 all have bright (light) values.

The middle graph in FIG. 5 shows an example of the conveyed-and-read image data i1 as acquired when a sheet is present between the light source 60 and the conveying image sensor 61 and in addition the light-transmitting plate 62 is clean. The sheet intercepts light. Accordingly, the amounts of light that the pixels that read the sheet receive are smaller than the amounts of light that the pixels that read outside the sheet receive. Thus, the pixels that read the sheet have dim (dark) pixel values; the pixels that read outside the sheet have bright (light) pixel values. The video control circuit 71 can recognize as the position of an edge of the sheet the position where adjacent pixels have greatly different pixel values.

The bottom graph in FIG. 5 shows an example of the conveyed-and-read image data i1 as acquired when no sheet is present between the light source 60 and the conveying image sensor 61 and in addition the light-transmitting plate 62 is soiled. Soil can irregularly reflect the light emitted from the light source 60. Or soil can absorb the light emitted from the light source 60. Thus, the amounts of light that the pixels (light-receiving elements) that read soil are smaller than the amounts of light that the pixels that read a region without soil receive. Thus, in the conveyed-and-read image data i1, the pixels that read soil have pixel values dimmer (darker) than those of the pixels that read a region without soil. Reading a sheet with the light-transmitting plate 62 soiled may lead to failure to distinguish a sheet edge from soil and hence to erroneous detection of an edge position. This may result in, for example, erroneous recognition of the size of the sheet in the main scanning direction.

In the printing device 100*b*, the reading unit 6 is embedded inside the printing device 100*b* (image forming apparatus 100). Thus, the light-transmitting plate 62 cannot be exposed. In other words, there is no way of exposing the light-transmitting plate 62. That is, there is no cover that permits the light-transmitting plate 62 to be exposed. To cope with that, the image forming apparatus 100 is configured such that the light-transmitting plate 62 can be cleaned with a cleaning rod 9. There is no way of cleaning the light-transmitting plate 62 while observing it by sight. Now, with reference to FIGS. 6 and 7, one example of the cleaning of the light-transmitting plate 62 will be described.

The cleaning of the light-transmitting plate 62 proceeds as follows. The cleaning person opens a front cover 106 of the printing device 100*b*. The printing device 100*b* can actually have two front covers 106. FIG. 6 shows a state where the two front covers 106 are both opened (about pivots at far ends of each other). The front covers 106 can each be opened and closed individually. Cleaning the light-transmitting plate 62 requires at least the right-hand one (right front cover 106R) of the front covers 106 to be opened. The image forming apparatus 100 may be fitted with a case for accommodating the cleaning rod 9. Or the inner face of a front cover 106 may be fitted with a holding member for holding the cleaning rod 9.

Opening the right front cover 106R permits an inner chassis 107 and a cleaning hole 108 to be exposed. The inner chassis 107 of the printing device 100*b* is provided with the cleaning hole 108. The cleaning hole 108 is provided in an upper right part of the front face of the inner chassis 107 (behind the right front cover 106R). FIG. 7 is an enlarged view of a part where the cleaning hole 108 is provided. The light-transmitting plate 62 is cleaned with the cleaning rod 9 inserted in the cleaning hole 108. An end part of the cleaning rod 9 is affixed with a soil-removing sheet 91 for rubbing off soil. For example, the soil-removing sheet 91 is a piece of non-fluffy cloth.

The cleaning hole 108 penetrates across the top side (the sheet conveying passage 412 side) of the light-transmitting plate 62. Putting the cleaning rod 9 into the cleaning hole 108 results in the soil-removing sheet 91 and the cleaning rod 9 being inserted at the top of the light-transmitting plate 62. By moving the cleaning rod 9 in the front-rear direction of the printing device 100*b* with the soil-removing sheet 91 in contact with the light-transmitting plate 62, it is possible to remove soil on the light-transmitting plate 62.

(Maintenance Mode)

Next, with reference to FIGS. 8 to 12, an example of a maintenance mode of the image forming apparatus 100 will be described. When cleaning the light-transmitting plate 62, the cleaning person (maintenance person) brings the image forming apparatus 100 into a maintenance mode. The operation panel 3 accepts a setting for bringing the image forming apparatus 100 into the maintenance mode. On receiving the setting for entering the maintenance mode, the controller 1 performs processes that are permitted only in the maintenance mode.

First, the controller 1 (control circuit 10) gives the video control circuit 71 (image superposing portion 7) and the engine control circuit 8 a notification that the maintenance mode has been entered. In response to the notification, the engine control circuit 8 continues to monitor whether the right front cover 106R is opened (step #2; "No" at step #2 leading to a return to step #2).

The printing device 100*b* includes an open/close sensor 109 (see FIG. 4) for detecting the right front cover 106R being open. The output level of the open/close sensor 109 with the right front cover 106R open differs from that with the right front cover 106R closed. The output of the open/close sensor 109 is fed to the engine control circuit 8. Based on the output level of the open/close sensor 109, the engine control circuit 8 recognizes whether the right front cover 106R is open or closed.

When the front cover 106 is opened ("Yes" at step #2), the engine control circuit 8 gives the controller 1 (control circuit 10) and the image superposing portion 7 (video control circuit 71) a notification that the right front cover 106R has been opened (step #3). Based on the notification, the video control circuit 71 (image superposing portion 7) turns on the light source 60 (step #4). The video control circuit 71 can control the operation of the light source 60 and the reading unit 6.

The video control circuit 71 makes the reading unit 6 (conveying image sensor 61) start reading (step #5). The AFE circuit 64 generates conveyed-and-read image data i1. The AFE circuit 64 makes the second memory 72 store the generated conveyed-and-read image data i1 (step #6). Thereafter, the reading unit 6 repeats reading at a predetermined period. The AFE circuit 64 repeats generating conveyed-and-read image data i1.

The video control circuit 71 starts to transmit the conveyed-and-read image data i1 newly stored in the second memory 72 to the first memory 21 (step #7). Only in the maintenance mode does the video control circuit 71 transmit the conveyed-and-read image data i1 to the first memory 21. There may be provided a data signal line D1 for transmitting the conveyed-and-read image data i1 from the second memory 72 to the first memory 21 (see FIG. 4).

Thereafter, the video control circuit 71 transmits, out of the conveyed-and-read image data i1 stored sequentially in the second memory 72, the latest part every predetermined period. The period is previously determined. For example, the period is set at about one second. The period may be less than one second or more than one second. The video control circuit 71 may discard, out of the conveyed-and-read image data i1 in the second memory 72, a part that has been stored there for more than a predetermined length of time. For example, the video control circuit 71 discards conveyed-and-read image data i1 that has been stored for more than one period.

Based on the conveyed-and-read image data i1 newly stored in the first memory 21, the controller 1 (control circuit 10) have a cleaning screen 30 start to be displayed (step #8). The cleaning screen 30 includes a graph G that shows the pixel values of the individual pixels. The cleaning screen 30 will be described in detail later.

The controller 1 checks whether an input to end cleaning has been made (step #9). The operation panel 3 may accept an instruction to end cleaning. For example a Cleaning End button B1 may be arranged on the cleaning screen 30 (see FIGS. 9 to 12). In this case, when the Cleaning End button B1 is operated, the controller 1 recognizes that an input to end the cleaning of the light-transmitting plate 62 has been made. An input to end cleaning may be a notification from the engine control circuit 8 that the right front cover 106R has been closed. In this case, when the open/close sensor 109 senses the right front cover 106R being closed, the engine control circuit 8 gives the controller 1 and the video control circuit 71 a notification that the right front cover 106R has been closed.

When no input to end cleaning has been made ("No" at step #9), then based on the conveyed-and-read image data i1 newly stored in the first memory 21, the controller 1 (control circuit 10) updates what is displayed on the cleaning screen 30 (step #10). The controller 1 updates the graph G and the message on the cleaning screen 30. Then the controller 1 executes step #9 (a return is made to step #9).

When an input to end cleaning is made ("Yes" at step #9), the controller 1 (control circuit 10) brings to an end the process for displaying the cleaning screen 30 (step #11). Specifically, the controller 1 gives the video control circuit 71 (image superposing portion 7) an instruction to turn off the light source 60. In response to the instruction, the video control circuit 71 makes the conveying image sensor 61 end reading, and makes the AFE circuit 64 end generating the conveyed-and-read image data i1.

The controller 1 also gives the video control circuit 71 an instruction to end the transmission of the conveyed-and-read image data i1 to the first memory 21. In response to the instruction, the video control circuit 71 ends the transmission of the conveyed-and-read image data i1. Furthermore, the controller 1 brings to an end the display of the cleaning screen 30 on the operation panel 3 (display panel 31). Now, the controller 1 (control circuit 10), the image superposing portion 7, and the engine control circuit 8 end the processes associated with the flow chart (END).

With reference to FIGS. 9 to 12, one example of the cleaning screen 30 will be described. In the maintenance mode, the controller 1 (control circuit 10) makes the display panel 31 display a cleaning screen 30. The controller 1 presents a graph G on the cleaning screen 30. The graph G is based on the conveyed-and-read image data i1, which is acquired by reading with the conveying image sensor 61. The graph G shows the distribution of the pixel values of the individual pixels in the conveyed-and-read image data i1.

On the cleaning screen 30, the horizontal axis of the graph G indicates the position (coordinate) of a pixel in the main scanning direction (the direction perpendicular to the sheet conveying direction). In FIGS. 9 to 12, the right side of the graph G corresponds to the front side (near side) of the image forming apparatus 100, and the left side of the graph G corresponds to the rear side (far side) of the image forming apparatus 100. That is, the controller 1 (control circuit 10) makes the display panel 31 display a graph G that shows the distribution of the pixel values of the individual pixels across different pixel positions in the main scanning direction. The vertical axis of the graph G indicates the level of density (bright or dim) represented by the pixel value of a pixel.

Furthermore, the controller 1 (control circuit 10) shows, within the graph G, a threshold value Th as a reference for soil removal. In FIGS. 9 to 12, a broken line indicates the line representing the threshold value Th. The threshold value Th can be used as a reference for deciding on the message to be indicated.

Figure 9:
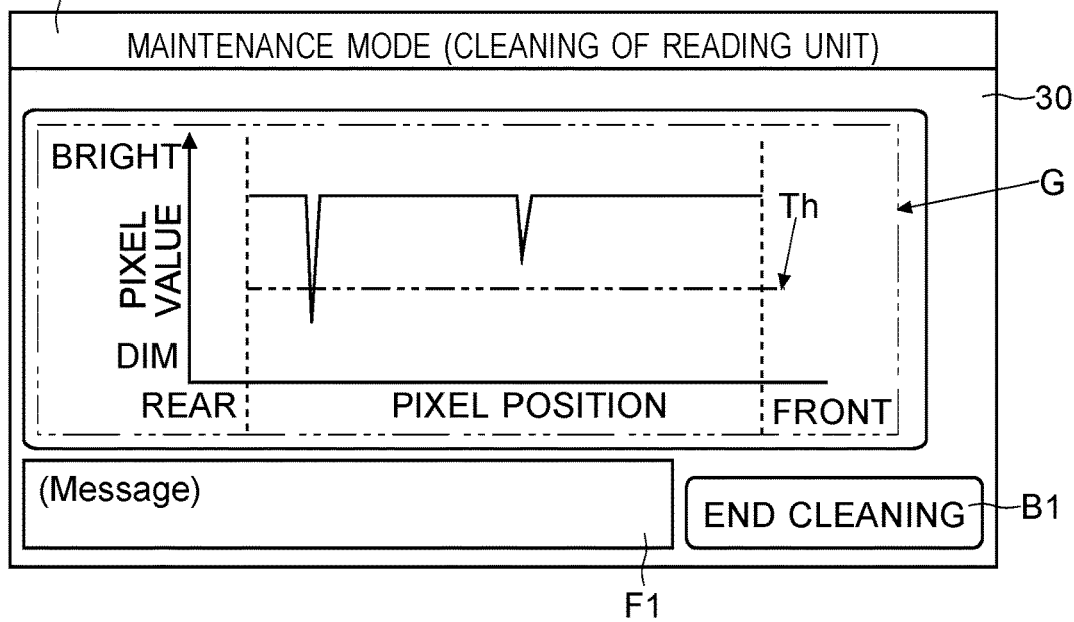
FIG. 9 is a diagram showing one example of a cleaning screen according to the embodiment.

FIG. 9 shows one example of the cleaning screen 30 as displayed before the cleaning rod 9 is inserted into the cleaning hole 108. As shown in FIG. 9, the pixels that read soil on the light-transmitting plate 62 have pixel values dimmer than those of the pixels that read a region without soil. Seeing the graph G, the cleaning person can identify the location of soil. It is possible, despite being unable to see the light-transmitting plate 62 directly, to identify the location of soil.

Figure 10:
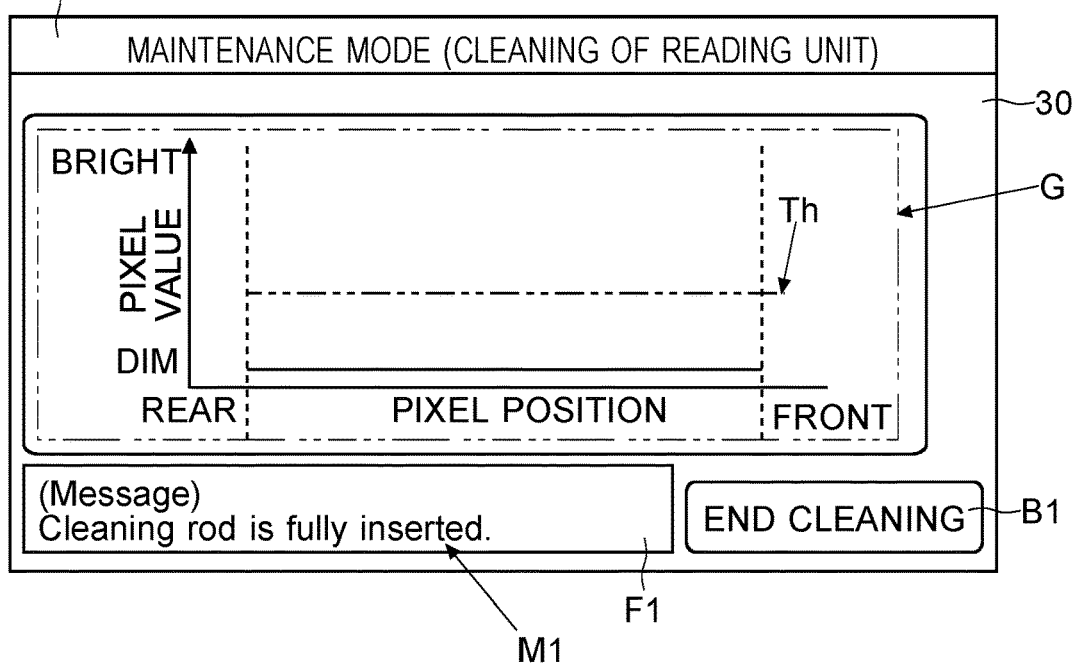
FIG. 10 is a diagram showing one example of the cleaning screen according to the embodiment.

FIG. 10 shows one example of the cleaning screen 30 as displayed when the cleaning rod 9 inserted into the cleaning hole 108 has reached its far end. In other words, FIG. 10 shows one example of the cleaning screen 30 as displayed when the surface of the light-transmitting plate 62 has been rubbed from one end to the other in the main scanning direction with the cleaning rod 9. The cleaning rod 9 intercepts light from striking the image sensor. Specifically, the cleaning rod 9 shields the entire light-transmitting plate 62. Thus, as shown in FIG. 10, all the pixels (light-receiving elements) of the image sensor are prevented from receiving light. The pixels all have dim pixel values. Seeing the graph G, the cleaning person can see whether the cleaning rod 9 has been fully inserted. It is possible, despite being unable to see the light-transmitting plate 62 directly, to check whether the light-transmitting plate 62 is wiped satisfactorily.

In the maintenance mode, it may be each time the graph G (cleaning screen 30) is updated that the controller 1 (control circuit 10) checks whether the cleaning rod 9 has been fully inserted. For example, the controller 1 may do the check based on, with respect to the conveyed-and-read image data i1 newly received by the first memory 21, the number of pixels with pixel values dimmer than the threshold value Th. For example, the controller 1 (control circuit 10) may judge that the cleaning rod 9 has been fully inserted when all the pixels have pixel values dimmer than the threshold value Th. Or the controller 1 (control circuit 10) may judge that the cleaning rod 9 has been fully inserted when the number of pixels with pixel values dimmer than the threshold value Th is equal to or more than a previously determined reference value. For example, the reference value may be any value in the range of 90% or more but less than 100% of the number of pixels of the conveying image sensor 61 (conveyed-and-read image data i1) in the main scanning direction.

When the cleaning rod 9 is judged to have been fully inserted, the controller 1 (control circuit 10) may make the display panel 31 display a first message M1. The first message M1 is a message indicating full insertion.

As shown in FIG. 9 to FIG. 12, the cleaning screen 30 includes a message display region F1. When the cleaning rod 9 is judged to have been fully inserted, the controller 1 (control circuit 10) has the first message M1 displayed in the message display region F1. FIG. 10 shows an example where, as the first message M1, the message "Cleaning rod is fully inserted." is displayed. This is not meant to limit the first message M1. The first message M1 can be any indication of full insertion.

Figure 11:
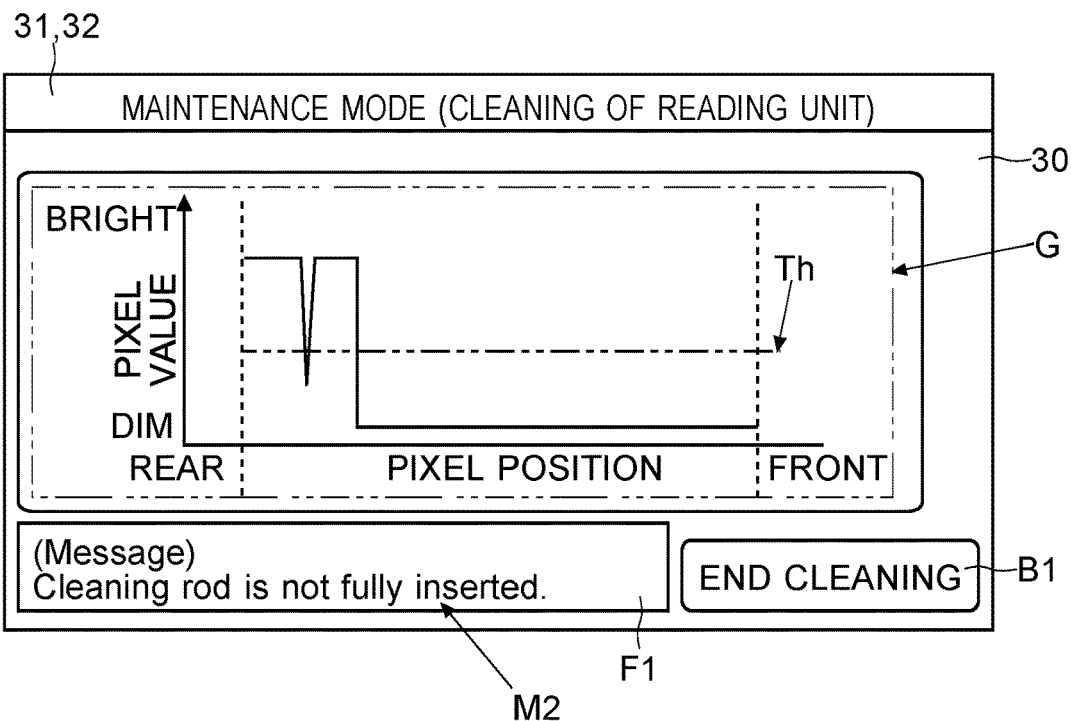
FIG. 11 is a diagram showing one example of the cleaning screen according to the embodiment.

FIG. 11 is one example of a state where the cleaning rod 9 is inserted up to short of the far end. The cleaning rod 9 intercepts light from striking the image sensor. As shown in FIG. 11, the pixels that read the cleaning rod 9 on the light-transmitting plate 62 have pixel values dimmer than those of the pixels that do not read the cleaning rod 9. Seeing the graph G, the cleaning person can grasp how far across the depth of the light-transmitting plate 62 the cleaning rod 9 has been inserted. It is possible, despite being unable to see the light-transmitting plate 62 directly, to grasp the depth of insertion.

Based on the conveyed-and-read image data i1 newly received by the first memory 21, the controller 1 judges whether the cleaning rod 9 has been inserted fully. For example, with respect to the conveyed-and-read image data i1, after the number of pixels with pixel values dimmer than the threshold value Th starts to increase, so long as that number is less than a reference value, the controller 1 (control circuit 10) may judge that the cleaning rod 9 has not been inserted fully. When the controller 1 judges that the cleaning rod 9 has not been inserted fully, the controller 1 may make the display panel 31 display a second message M2. The second message M2 is a message indicating incomplete insertion of the cleaning rod 9.

The controller 1 (control circuit 10) has the second message M2 displayed in the message display region F1. FIG. 11 shows an example where, as the second message M2, the message "Cleaning rod is not fully inserted" is displayed. This is not meant to limit the second message M2. The second message M2 can be any indication of incomplete insertion.

After the cleaning rod 9 is judged to have been fully inserted, the controller 1 (control circuit 10) may check whether the cleaning rod 9 has been removed. After at least one judgment of full insertion, with respect to the conveyed-and-read image data i1 newly received by the first memory 21, when there is not a single pixel with a pixel value dimmer than a previously determined judgment reference value, the controller 1 may judge that the cleaning rod 9 has been removed. The judgment reference value is set at a vale dimmer than the threshold value Th. For example, the judgment reference value can be set at the average value of the pixel values of the pixels that read the cleaning rod 9. That is, when no pixel is recognized to read the cleaning rod 9, the controller 1 judges that the cleaning rod 9 has been removed. Or, after the number of pixels with pixel values dimmer than the threshold value Th starts to decrease, when thereafter that number ceases to change, the controller 1 may judge that the cleaning rod 9 has been removed. Any other method may be used to judge whether the cleaning rod 9 has been removed.

After the cleaning rod 9 is judged to have been removed, with respect to the conveyed-and-read image data i1 then newly received by the first memory 21, the controller 1 (control circuit 10) checks whether there is any pixel with a pixel value less than the threshold value Th as the reference for soil removal. The controller 1 checks, using the threshold value Th, whether there still is soil after cleaning.

When there is any pixel with a pixel value less than the threshold value Th, the controller 1 (control circuit 10) may makes the display panel 31 display a third message M3. The third message M3 is a message recommending inserting the cleaning rod 9 once again.

Figure 12:
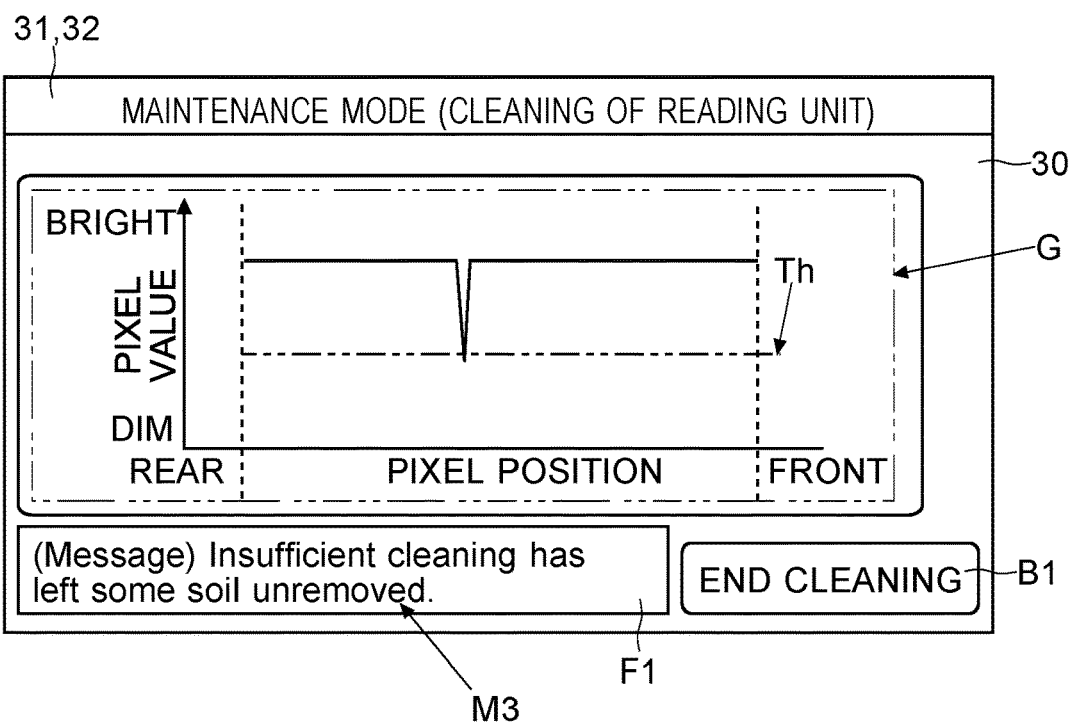
FIG. 12 is a diagram showing one example of the cleaning screen according to the embodiment.

The controller 1 (control circuit 10) may have the third message M3 displayed in the message display region F1. FIG. 12 shows an example where, as the third message M3, the message "Insufficient cleaning has left some soil unremoved." is displayed. This is not meant to limit the third message M3. The third message M3 can be any indication of the need to continue cleaning.

As described above, an image forming apparatus 100 according to an embodiment includes a display panel 31, a sheet conveying passage 412, a reading unit 6, a light source 60, a chassis (inner chassis 107), and a controller 1. Along the sheet conveying passage 412, sheets are conveyed. The reading unit 6 includes a light-transmitting plate 62. The reading unit 6 also includes a conveying image sensor 61 that reads a conveyed sheet, that is, a sheet on which to print and that is conveyed while facing the light-transmitting plate 62. The light source 60 faces the light-transmitting plate 62. The light source 60 is so arranged that the conveyed sheet passes between it and the conveying image sensor 61 The light source 60 emits light toward the conveying image sensor 61. The chassis (inner chassis 107) includes a cleaning hole 108 in which to insert a cleaning rod 9 for rubbing the light-transmitting plate 62. In the maintenance mode, the controller 1 turns on the light source 60 and makes the display panel 31 display a graph G showing the pixel values of the pixels included in conveyed-and-read image data i1 acquired by reading with the conveying image sensor 61.

In a region with soil (dust, particles of paper) on the light-transmitting plate 62 (contact glass), the light from the light source 60 is disturbed or absorbed. The pixels that read soil have pixel values dimmer (darker) than those of the pixels that read a region without soil. By seeing the graph G, the user can identify the location of soil on the light-transmitting plate 62. It is possible, despite being unable to see the light-transmitting plate 62 directly, to know where to rub the light-transmitting plate 62 to remove soil effectively.

The cleaning rod 9 intercepts the light from the light source 60 from reaching the image sensor. With the cleaning rod 9 inserted in the cleaning hole 108, the pixels that read the cleaning rod 9 have dim (dark) pixel values. By seeing the pixel values of the pixels on the display panel 31, it is possible to check whether the cleaning rod 9 has been inserted fully up to the far end. It is possible to check whether the light-transmitting plate 62 has been cleaned (wiped) thoroughly. It is possible, despite being unable to see the light-transmitting plate 62 directly, to perform cleaning without leaving soil behind.

The image forming apparatus 100 includes a first memory 21, a second memory 72, and a data signal line D1. The first memory 21 is communicably connected to the controller 1, and stores print image data i0 to be used in printing. The second memory 72 stores the conveyed-and-read image data i1 acquired by reading with the conveying image sensor 61. The second memory 72 stores superposed image data i3 resulting from processing the print image data i0 from the first memory 21 based on the conveyed-and-read image data i1. The data signal line D1 is used to transmit the conveyed-and-read image data i1 from the second memory 72 to the first memory 21. In the maintenance mode, the controller makes the display panel 31 display the graph G based on the conveyed-and-read image data i1 transmitted from the second memory 72 to the first memory 21. In an image forming apparatus 100, a part (circuit) that generates image data and a part (circuit) that performs printing based on the generated image data can be provided separately. In that case, the image data is transmitted from the image data generating circuit side to the printing performing circuit side. The flow of the image data is often not by bidirectional communication but by one-way communication. Accordingly, for the purpose of feeding the conveyed-and-read image data i1 to upstream of the flow of the image data, a signal line for feeding the image data from the second memory 72 to the first memory 21 is provided. Providing the signal line permits transmission from the printing performing circuit side (second memory 72) to the image data generating circuit side (first memory 21).

The conveying image sensor 61 is a line sensor. The conveyed-and-read image data i1 is image data corresponding to one line. In the maintenance mode, the controller 1 makes the display panel 31 display the graph G showing the pixel values of the pixels across different positions in the main scanning direction of the conveying image sensor 61. The controller 1 has a threshold value Th as a reference for soil removal displayed in the graph G. By comparing the pixel values with the threshold value Th, it is possible to identify the location of soil, and to check whether the light-transmitting plate 62 has been cleaned satisfactorily.

In the maintenance mode, the controller 1 checks whether the cleaning rod 9 has been inserted fully based on the number of pixels with pixel values dimmer than the threshold value Th in the conveyed-and-read image data i1. The controller 1, on judging that the cleaning rod 9 has been inserted fully, makes the display panel 31 display a first message M1 indicating full insertion. It is possible to let the cleaning person know that the cleaning rod 9 has been inserted fully up to the far end. It is possible to let the cleaning person know that the cleaning rod 9 does not need to be pushed in any further.

In the maintenance mode, the controller 1, on judging that the cleaning rod has not been inserted fully, makes the display panel 31 display a second message M2 indicating incomplete insertion. It is possible to let the cleaning person know that the cleaning rod 9 has not been inserted fully up to the far end.

In the maintenance mode, the controller 1, after judging that the cleaning rod 9 has been inserted fully, checks whether the cleaning rod 9 has been removed. The controller 1, after judging that the cleaning rod 9 has been removed, if there is a pixel with a pixel value less than the threshold value Th in the conveyed-and-read image data i1 newly generated, makes the display panel 31 display a third message M3 recommending inserting the cleaning rod once again. It is possible to let the cleaning person know that soil is still left behind.

The controller 1 may judge that the cleaning rod 9 has been inserted fully when all the pixels in the conveyed-and-read image data i1 have pixel values dimmer than the threshold value Th, or when the number of pixels with pixel values dimmer than the threshold value Th in the conveyed-and-read image data i1 is equal to or more than a previously determined reference value. It is possible to accurately check whether the cleaning rod 9 has been inserted fully.

The image forming apparatus 100 may further include a front cover 106 (right front cover 106R). Opening the front cover 106 causes the cleaning hole 108 to be exposed. It is possible to prevent entry of dust and dirt through the cleaning hole.

The image forming apparatus 100 may further include an operation panel that accepts a setting to enter the maintenance mode. It is possible to switch to the maintenance mode easily.

While some embodiments and modified examples according to the present disclosure have been described above, they are not in any way meant to limit the scope of the present disclosure, which can thus be implemented with any modifications made without departure from the spirit of the present disclosure.

What is claimed is:

1. An image forming apparatus, comprising:
   a display panel;
   a sheet conveying passage along which a sheet is conveyed;
   a reading unit including:
      a light-transmitting plate; and
      a conveying image sensor that reads a conveyed sheet, the conveyed sheet being a sheet on which to print and being conveyed while facing the light-transmitting plate;
   a light source that faces the light-transmitting plate and that emits light toward the conveying image sensor;
   a chassis including a cleaning hole in which to insert a cleaning rod for rubbing the light-transmitting plate; and
   a controller that, in a maintenance mode, turns on the light source and makes the display panel display a graph showing pixel values of pixels included in conveyed-and-read image data acquired by reading with the conveying image sensor.

2. The image forming apparatus according to claim 1, further comprising:
   a first memory that is communicably connected to the controller and that stores print image data to be used in printing;
   a second memory that stores the conveyed-and-read image data acquired by reading with the conveying image sensor and that stores superposed image data resulting from processing the print image data from the first memory based on the conveyed-and-read image data; and
   a data signal line for transmitting the conveyed-and-read image data from the second memory to the first memory,
   wherein
   in the maintenance mode, the controller makes the display panel display the graph based on the conveyed-and-read image data transmitted from the second memory to the first memory.

3. The image forming apparatus according to claim 1, wherein
   the conveying image sensor is a line sensor;
   the conveyed-and-read image data is image data corresponding to one line, and
   in the maintenance mode, the controller makes the display panel display the graph showing the pixel values of the pixels across different positions in a main scanning direction of the conveying image sensor and has a threshold value as a reference for soil removal displayed in the graph.

4. The image forming apparatus according to claim 3, wherein in the maintenance mode, the controller checks whether the cleaning rod has been inserted fully based on the number of pixels with pixel values dimmer than the threshold value in the conveyed-and-read image data, and the controller, on judging that the cleaning rod has been inserted fully, makes the display panel display a first message indicating full insertion.

5. The image forming apparatus according to claim 4, wherein in the maintenance mode, the controller, on judging that the cleaning rod has not been inserted fully, makes the display panel display a second message indicating incomplete insertion.

6. The image forming apparatus according to claim 4, wherein in the maintenance mode, the controller, after judging that the cleaning rod has been inserted fully, checks whether the cleaning rod has been removed, and the controller, after judging that the cleaning rod has been removed, if there is a pixel with a pixel value less than the threshold value in the conveyed-and-read image data newly generated, makes the display panel display a third message recommending inserting the cleaning rod once again.

7. The image forming apparatus according to claim 4, wherein when all the pixels in the conveyed-and-read image data have pixel values dimmer than the threshold value, or when a number of pixels with pixel values dimmer than the threshold value in the conveyed-and-read image data is equal to or more than a previously determined reference value, the controller judges that the cleaning rod has been inserted fully.

8. The image forming apparatus according to claim 1, further comprising a front cover, wherein opening the front cover causes the cleaning hole to be exposed.

9. The image forming apparatus according to claim 1, further comprising an operation panel that accepts a setting to enter the maintenance mode.

10. A method of controlling an image forming apparatus, the method comprising:

conveying a sheet along a sheet conveying passage;

reading with a conveying image sensor a conveyed sheet, the conveyed sheet being a sheet on which to print and being conveyed while facing a light-transmitting plate;

emitting light from a light source facing the light-transmitting plate toward the conveying image sensor;

inserting in a cleaning hole a cleaning rod for rubbing the light-transmitting plate; and in a maintenance mode, turning on the light source and displaying a graph showing pixel values of pixels included in conveyed-and-read image data acquired by reading with the conveying image sensor.

* * * * *